(12) United States Patent
Suzuki et al.

(10) Patent No.: US 11,970,593 B2
(45) Date of Patent: Apr. 30, 2024

(54) HARD COAT FILM AND METHOD FOR PRODUCING SAME

(71) Applicant: NIPPON PAPER INDUSTRIES CO., LTD., Tokyo (JP)

(72) Inventors: Takeo Suzuki, Tokyo (JP); Narihiro Ilo, Tokyo (JP); Takashi Ino, Tokyo (JP); Yusuke Sugiyama, Tokyo (JP); Yasuaki Yoshida, Tokyo (JP); Takuya Takahashi, Tokyo (JP); Syunji Sekiguchi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 276 days.

(21) Appl. No.: 17/263,048

(22) PCT Filed: Jul. 23, 2019

(86) PCT No.: PCT/JP2019/028855
§ 371 (c)(1),
(2) Date: Jan. 25, 2021

(87) PCT Pub. No.: WO2020/022334
PCT Pub. Date: Jan. 30, 2020

(65) Prior Publication Data
US 2021/0309821 A1    Oct. 7, 2021

(30) Foreign Application Priority Data

| Jul. 27, 2018 | (JP) | ................................. | 2018-141398 |
| Sep. 29, 2018 | (JP) | ................................. | 2018-186209 |
| Sep. 29, 2018 | (JP) | ................................. | 2018-186210 |
| Sep. 29, 2018 | (JP) | ................................. | 2018-186211 |
| Jan. 25, 2019 | (JP) | ................................. | 2019-011083 |

(51) Int. Cl.
| C08J 7/04 | (2020.01) |
| C08J 7/12 | (2006.01) |
| C09D 133/14 | (2006.01) |
| C09D 151/06 | (2006.01) |

(52) U.S. Cl.
CPC .............. *C08J 7/042* (2013.01); *C08J 7/123* (2013.01); *C09D 133/14* (2013.01); *C09D 151/06* (2013.01); *C08J 2345/00* (2013.01); *C08J 2433/14* (2013.01); *C08J 2451/06* (2013.01)

(58) Field of Classification Search
CPC combination set(s) only.
See application file for complete search history.

(56) References Cited

FOREIGN PATENT DOCUMENTS

| JP | H10-119204 A | 5/1998 |
| JP | 2000-327789 A | 11/2000 |
| JP | 2001-147304 A | 5/2001 |
| JP | 2004-051804 A | 2/2004 |
| JP | 2004-284158 A | 10/2004 |
| JP | 2005-281537 A | 10/2005 |
| JP | 2005281537 A * | 10/2005 |
| JP | 2006-110875 A | 4/2006 |
| JP | 2014-240174 A | 12/2014 |
| JP | 2015-229710 A | 12/2015 |
| WO | 2005/082963 A1 | 9/2005 |
| WO | 2015/186733 A1 | 12/2015 |
| WO | 2019/146622 A1 | 8/2019 |

OTHER PUBLICATIONS

International Search Report for PCT/JP2019/028855 dated Sep. 10, 2019 (PCT/ISA/210).
Communication dated Aug. 29, 2022 in Chinese Application No. 201980048823.2.
Communication dated Jul. 5, 2022 in Japanese Application No. 2018-186209.
Communication dated Jul. 5, 2022 in Japanese Application No. 2018-186210.
Communication dated Jul. 5, 2022 in Japanese Application No. 2018-186211.
Communication dated Jan. 10, 2023 in Japanese Application No. 2019-011083.

* cited by examiner

*Primary Examiner* — Ramsey Zacharia
(74) *Attorney, Agent, or Firm* — Sughrue Mion, PLLC

(57) ABSTRACT

The present invention provides a hard coat film having excellent adhesion to a hard coat layer when a cycloolefin polymer film is used as a base material.
The hard coat film of the present invention comprises a hard coat layer containing an ionizing radiation curable resin laminated on at least one surface of a cycloolefin polymer base film through a primer layer. This primer layer contains a modified polyolefin resin in which a polyolefin resin is graft-modified with an $\alpha,\beta$-unsaturated carboxylic acid or a derivative thereof, and a (meth)acrylic acid ester. In this modified polyolefin resin, the graft weight of the $\alpha,\beta$-unsaturated carboxylic acid or derivative thereof is 0.4 to 7 wt. % when the amount of the modified polyolefin resin is taken as 100 wt. %.

14 Claims, No Drawings

HARD COAT FILM AND METHOD FOR PRODUCING SAME

CROSS REFERENCE TO RELATED APPLICATIONS

This application is a National Stage of International Application No. PCT/JP2019/028855 filed Jul. 23, 2019, claiming priority based on Japanese Patent Application No. 2018-141398 filed Jul. 27, 2018, Japanese Patent Application No. 2018-186209 filed Sep. 29, 2018, Japanese Patent Application No. 2018-186210 filed Sep. 29, 2018, Japanese Patent Application No. 2018-186211 filed Sep. 29, 2018, and Japanese Patent Application No. 2019-011083 filed Jan. 25, 2019, the disclosures of which are incorporated herein by reference in their respective entireties.

TECHNICAL FIELD

The present invention relates to a hard coat film used for optical members and a method for producing the same. More specifically, the present invention relates to a hard coat film that can be used as a protective film for panel displays such as electroluminescence (EL) display devices, liquid crystal display (LCD) devices, and plasma display devices; and display device components such as touch panels.

BACKGROUND ART

For example, display surfaces of liquid crystal displays such as liquid crystal display (LCD) devices are required to have scratch resistance so that the surfaces are not damaged during handling to thereby reduce the visibility. Therefore, it is common practice to impart scratch resistance to the display surfaces of displays using hard coat films obtained by providing hard coat layers on base films. In recent years, with the spread of touch panels that allow data and instructions to be input by touching with a finger, a pen, or the like while viewing the display on the display screen, functional requirements for hard coat films used for such optical members are further increasing.

Cycloolefin polymer films have excellent transparency, heat resistance, dimensional stability, low hygroscopicity, low birefringence, and optical isotropy as base films, and are thus expected to be applied to such optical members. It has been proposed to provide a hard coat layer on such cycloolefin films. However, unlike acrylic films or polyester films, the cycloolefin polymer films had a small number of polar groups on the film surface; thus, when the cycloolefin polymer films were used as base materials, there was a problem of inferior adhesion to hard coat layers.

Therefore, Patent Literature 1, Patent Literature 2, and the like disclose conventional methods for imparting, to cycloolefin polymer films, easy adhesion to hard coat layers.

CITATION LIST

Patent Literature

Patent Literature 1: JP2001-147304A
Patent Literature 2: JP2006-110875A

SUMMARY OF INVENTION

Technical Problem

Patent Literature 1 discloses corona treatment, plasma treatment, ultraviolet irradiation treatment, and the like as conventional methods for imparting, to cycloolefin polymer films, easy adhesion to hard coat layers. However, these methods had problems in that the adhesion between the cycloolefin polymer films and the hard coat layers was insufficient.

Further, Patent Literature 2 discloses a method of applying an anchor coating agent comprising an olefin resin to a cycloolefin polymer film. Due to this anchor coating treatment, the adhesion between the cycloolefin polymer film and the hard coat layer was improved to some extent, but was still insufficient. Furthermore, there was a problem in that cracks were likely to occur on the surface of the hard coat layer under heat-resistant conditions. Even when anchor coating treatment with such a specific material was performed, the improvement of the adhesion between the base film and the hard coat layer was insufficient.

Therefore, the conventional hard coat films had a major challenge in improving the adhesion to hard coat layers when using cycloolefin polymer films as base materials.

Accordingly, an object of the present invention is to provide a hard coat film having particularly excellent adhesion to a hard coat layer and using a cycloolefin polymer film as a base material; and to also provide a method for producing the same.

Solution to Problem

As a result of extensive studies to solve the above problems, the present inventors have found that the adhesion to the hard coat layer can be improved by using a specific resin in the primer layer.

That is, the present invention has the following configurations in order to solve the above problems.

(First Invention)

A hard coat film comprising a hard coat layer containing an ionizing radiation curable resin laminated on at least one surface of a cycloolefin polymer base film through a primer layer, wherein:

the primer layer contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof is in the range of 0.4 to 7 wt. % when the amount of the modified polyolefin resin is taken as 100 wt. %.

(Second Invention)

The hard coat film according to the first invention, wherein the modified polyolefin resin has a weight average molecular weight in the range of 40,000 to 150,000.

(Third Invention)

The hard coat film according to the first invention, wherein the modified polyolefin resin has a melting point in the range of 60° C. to 90° C.

(Fourth Invention)

The hard coat film according to the first invention, wherein the modified polyolefin resin has a glass transition temperature in the range of −30° C. to −10° C.

(Fifth Invention)

The hard coat film according to any one of the first to fourth inventions, wherein the polyolefin resin is a propylene-ethylene copolymer.

(Sixth Invention)

A hard coat film comprising a hard coat layer containing an ionizing radiation curable resin laminated on at least one surface of a cycloolefin polymer base film through a primer layer, wherein:

the primer layer contains a modified polyolefin resin in which a propylene-ethylene copolymer is graft-modified with an α,β-unsaturated carboxylic acid or a derivative thereof, and a (meth)acrylic acid ester.

(Seventh Invention)

The hard coat film according to the sixth invention, wherein the ratio (wt. %) of a propylene component to an ethylene component (propylene component/ethylene component) in the propylene-ethylene copolymer is in the range of 60/40 to 92/8.

(Eighth Invention)

The hard coat film according to any one of the first to seventh inventions, wherein the α,β-unsaturated carboxylic acid or derivative thereof is one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

(Ninth Invention)

The hard coat film according to any one of the first to eighth inventions, wherein the hard coat layer contains, as the ionizing radiation curable resin, a polyfunctional acrylate having three or more (meth)acryloyloxy groups per molecule.

(Tenth Invention)

A method for producing a hard coat film having a hard coat layer containing an ionizing radiation curable resin on a cycloolefin polymer base film through a primer layer, the method comprising:

applying a primer layer paint to the cycloolefin polymer base film, followed by drying to form a primer layer, wherein the primer layer paint contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof is in the range of 0.4 to 7 wt. % when the amount of the modified polyolefin resin is taken as 100 wt. %;

then applying a hard coat layer paint containing an ionizing radiation curable resin to the primer layer, followed by drying to form a hard coat layer; and then performing ionizing radiation irradiation.

(Eleventh Invention)

The method for producing a hard coat film according to the tenth invention, wherein the modified polyolefin resin has a weight average molecular weight in the range of 40,000 to 150,000.

(Twelfth Invention)

The method for producing a hard coat film according to the tenth invention, wherein the modified polyolefin resin has a melting point in the range of 60° C. to 90° C.

(Thirteenth Invention)

The method for producing a hard coat film according to the tenth invention, wherein the modified polyolefin resin has a glass transition temperature in the range of −30° C. to −10° C.

(Fourteenth Invention)

The method for producing a hard coat film according to any one of the tenth to thirteenth inventions, wherein the polyolefin resin is a propylene-ethylene copolymer.

(Fifteenth Invention)

A method for producing a hard coat film having a hard coat layer containing an ionizing radiation curable resin on a cycloolefin polymer base film through a primer layer, the method comprising:

applying a primer layer paint to the cycloolefin polymer base film, followed by drying to form a primer layer, wherein the primer layer paint contains a modified polyolefin resin in which a propylene-ethylene copolymer is graft-modified with an α,β-unsaturated carboxylic acid or a derivative thereof, and a (meth)acrylic acid ester;

then applying a hard coat layer paint containing an ionizing radiation curable resin to the primer layer, followed by drying to form a hard coat layer; and then performing ionizing radiation irradiation.

(Sixteenth Invention)

The method for producing a hard coat film according to the fifteenth invention, wherein the ratio (wt. %) of a propylene component to an ethylene component (propylene component/ethylene component) in the propylene-ethylene copolymer is in the range of 60/40 to 92/8.

(Seventeenth Invention)

The method for producing a hard coat film according to any one of the tenth to sixteenth inventions, wherein the α,β-unsaturated carboxylic acid or derivative thereof is one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

(Eighteenth Invention)

The method for producing a hard coat film according to any one of the tenth to seventeenth inventions, wherein the hard coat layer contains, as the ionizing radiation curable resin, a polyfunctional acrylate having three or more (meth)acryloyloxy groups per molecule.

Advantageous Effects of Invention

According to the present invention, a hard coat film having particularly excellent adhesion to a hard coat layer and using a cycloolefin polymer film as a base material.

DESCRIPTION OF EMBODIMENTS

Embodiments for carrying out the present invention will be described in detail below; however, the present invention is not limited to the following embodiments.

In the present specification, the phrase "○○ to ΔΔ" means "○○ or more and ΔΔ or less," unless otherwise specified.

[Hard Coat Film]

As in the first invention described above, the hard coat film of the present invention comprises a hard coat layer containing an ionizing radiation curable resin laminated on at least one surface of a cycloolefin polymer base film through a primer layer, wherein the primer layer contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof is in the range of 0.4 to 7 wt. % when the amount of the modified polyolefin resin is taken as 100 wt. %.

Further, as in the second invention described above, the hard coat film of the present invention is the hard coat film according to the first invention, wherein the modified polyolefin resin has a weight average molecular weight in the range of 40,000 to 150,000.

Moreover, as in the third invention described above, the hard coat film of the present invention is the hard coat film according to the first invention, wherein the modified polyolefin resin has a melting point in the range of 60° C. to 90° C.

Furthermore, as in the fourth invention described above, the hard coat film of the present invention is the hard coat film according to the first invention, wherein the modified polyolefin resin has a glass transition temperature in the range of −30° C. to −10° C.

In addition, as in the sixth invention described above, the hard coat film of the present invention is a hard coat film comprising a hard coat layer containing an ionizing radiation curable resin laminated on at least one surface of a cycloolefin polymer base film through a primer layer, wherein the primer layer contains a modified polyolefin resin in which a propylene-ethylene copolymer is graft-modified with an α,β-unsaturated carboxylic acid or a derivative thereof, and a (meth)acrylic acid ester.

The configurations of these hard coat films will be described in detail below.

[Base Film]

First, the base film of the hard coat film will be described.

In the present invention, a cycloolefin polymer film having excellent transparency, heat resistance, dimensional stability, low hygroscopicity, low birefringence, optical isotropy, etc., is used as the base film of the hard coat film. Specifically, this film is one in which cycloolefin units are polymerized alternately or randomly in the polymer skeleton, and which has an alicyclic structure in the molecular structure. The subject thereof is a cycloolefin copolymer film, which is a copolymer containing at least one compound selected from norbornene compounds, monocyclic olefins, cyclic conjugated dienes, and vinyl alicyclic hydrocarbons; or a cycloolefin polymer film. Either of these films can be suitably selected and used.

Further, in the present invention, the thickness of the cycloolefin polymer film is suitably selected depending on the application, but is preferably in the range of 10 μm to 300 μm, and more preferably in the range of 20 μm to 200 μm, from the viewpoint of mechanical strength, handling properties, thinning of display devices, and the like.

Moreover, regarding the heat resistance of the cycloolefin polymer film, in cases of use for hard coat films, it is preferable to use a film having a glass transition temperature of about 120° C. to 170° C. measured with the thermogravimetry (TG) method or the differential scanning calorimetry (DSC) method, both of which measure heat changes when temperature changes are applied to samples.

In the present invention, when a hard coat layer is formed on one surface of the cycloolefin polymer film through a primer layer, the back surface of the cycloolefin polymer film, on which the hard coat layer is not formed, may be laminated with a polyethylene resin, a polypropylene resin, or a polyester resin, all of which have excellent releasability from the cycloolefin polymer film using a co-extrusion method during formation of the cycloolefin polymer film, as a protective layer for the purpose of preventing crimping during winding of the cycloolefin polymer film and improving the running properties of the film during formation of the hard coat layer. It is also possible to use a film to which a protective film, such as a polyethylene resin, a polypropylene resin, or a polyester resin having a weak adhesive layer formed on the back surface thereof, is attached.

Examples of the cycloolefin polymer film include the commercially available Zeonor (trade name: produced by Zeon Corporation), Optica (trade name: produced by Mitsui Chemicals, Inc.), Arton (trade name: produced by JSR Corporation), Coxec (trade name: produced by Kurabo Industries Ltd.), and the like.

[Primer Layer]

Next, the primer layer of the hard coat film will be described.

In the hard coat film of the present invention, it is important that the primer layer contains a modified polyolefin resin in which a polyolefin resin is graft-modified with an α,β-unsaturated carboxylic acid or a derivative thereof, and a (meth)acrylic acid ester, and that the graft weight of the α,β-unsaturated carboxylic acid or derivative thereof in this modified polyolefin resin is in the range of 0.4 to 7 wt. % when the amount of the modified polyolefin resin is taken as 100 wt. %.

The hard coat film of the present invention uses a primer layer between the base film and the hard coat layer. Since the primer layer contains the above-mentioned modified polyolefin resin, and the graft weight of the α,β-unsaturated carboxylic acid or derivative thereof in the modified polyolefin resin is within a specific range, the adhesion to the hard coat layer can be improved when a cycloolefin polymer film is used as the base material.

It is known that the above modified polyolefin resin has good adhesion to both polypropylene, which is a low-polar base material, and a topcoat layer comprising a high-polar resin such as acrylic resin or urethane resin as a main component, as a prime layer between them. The base film (cycloolefin polymer film) of the present invention is an olefin-based low-polar base material, as with polypropylene, and the hard coat layer comprises a high-polar acrylic resin as a main component; therefore, the above modified polyolefin resin is considered to be suitable as a primer layer resin between the base film and the hard coat layer.

The resin as the main component constituting the primer layer of the present invention is a modified polyolefin resin in which a polyolefin resin is graft-modified with an α,β-unsaturated carboxylic acid or a derivative thereof, and a (meth)acrylic acid ester.

The above polyolefin resin (hereinafter also simply referred to as "the component (A)") is preferably a copolymerized polyolefin resin. Examples thereof include α-olefin copolymerized polypropylenes such as a propylene-ethylene copolymer, a propylene-1-butene copolymer, a propylene-1-pentene copolymer, and a propylene-1-hexene-copolymer.

Preferred among these is a propylene-ethylene copolymer (a copolymer mainly comprising a propylene component and an ethylene component). The ratio (wt. %) of the propylene component to the ethylene component (propylene component/ethylene component) in this case is preferably in the range of 60/40 to 92/8, and particularly preferably in the range of 85/15 to 90/10, from the viewpoint of adhesion to the hard coat layer.

If the ratio of the propylene component to the ethylene component in the propylene-ethylene copolymer is out of the above range, that is, for example, if the ratio of the propylene component exceeds 92 wt. % (the ratio of the ethylene component is less than 8 wt. %), or if the ratio of the propylene component is less than 60 wt. % (the ratio of the ethylene component exceeds 40 wt. %), the effect of improving the adhesion to the hard coat layer may not be sufficiently obtained.

In the present invention, the above copolymerized polyolefin resin is not limited to the two-component copolymer exemplified above. For example, it may be a copolymer comprising three components including, for example, a butene component as a copolymer component other than the propylene component and the ethylene component. In this case, the ratio of the butene component is preferably 15 wt. % or less of the whole.

The ratio of each component (copolymer component) in the copolymerized polyolefin resin can be measured by performing $^1$H-NMR (proton nuclear magnetic resonance) analysis at 120° C. using ortho-dichlorobenzene (d$_4$) as a measuring solvent.

The copolymerized polyolefin resin as the component (A) can be obtained by a known synthetic method.

In the present invention including the Examples described later, the ratio of each component in the copolymerized polyolefin resin as the component (A) refers to the value measured by the above measurement method.

Further, examples of the α,β-unsaturated carboxylic acid or derivative thereof (hereinafter also simply referred to as "the component (B)") include maleic acid, maleic anhydride, fumaric acid, citraconic acid, citraconic anhydride, mesaconic acid, itaconic acid, itaconic anhydride, aconitic acid, aconitic anhydride, himic anhydride, (meth)acrylic acid, and the like; maleic anhydride is particularly preferable. One or more compounds selected from these compounds may be used. In this case, one or more α,β-unsaturated carboxylic acids and one or more α,β-unsaturated carboxylic acid derivatives may be used in combination.

The present inventors found that when the modified polyolefin resin was used in the primer layer, wherein the graft weight of the component (B) was 0.4 to 7 wt. % when the amount of the modified polyolefin resin was taken as 100 wt. %, the adhesion to the hard coat layer could be further improved when using a cycloolefin polymer film as the base material. The graft weight of the component (B) affects the degree of acid (unsaturated carboxylic acid) modification of the obtained modified polyolefin resin.

Moreover, the graft weight of the component (B) in the modified polyolefin resin is preferably in the range of 0.4 to 7 wt. % and more preferably in the range of 0.6 to 6.5 wt. % when the amount of the modified polyolefin resin is taken as 100 wt. %. When the graft weight of the component (B) is 0.4 wt. % or more, it is possible to improve the adhesion to the hard coat layer by using the obtained modified polyolefin resin in the primer layer. Further, when the graft weight of the component (B) is 7 wt. % or less, it is possible to prevent the formation of a large amount of ungrafted reactants. The graft weight % of the component (B) is the percentage of component (B) units actually grafted on the polymer chain when the amount of the modified polyolefin resin is taken as 100 wt. %.

The graft weight % of the component (B) can be measured by a known method. For example, it can be determined by an alkali titration method or Fourier transform infrared spectroscopy.

In addition, the above (meth)acrylic acid ester (hereinafter also simply referred to as "the component (C)"), is an ester of acrylic acid or methacrylic acid. Examples thereof include methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, cyclohexyl (meth)acrylate, benzyl (meth)acrylate, phenyl (meth)acrylate, dimethylaminoethyl (meth)acrylate, di ethyl amino ethyl (meth)acrylate, 2-hydroxyethyl (meth)acrylate, N,N-dimethylaminoethyl (meth)acrylate, acetoacetoxyethyl (meth)acrylate, and the like.

The component (C) preferably contains a (meth)acrylic acid ester represented by the following general formula (I), and is more preferably a (meth)acrylic acid ester represented by the following general formula (I).

$$CH_2=CR_1COOR_2 \quad (I)$$

In the general formula (I), $R_1$ represents a hydrogen atom or a methyl group, and is particularly preferably a methyl group. $R_2$ represents $-C_nH_{2n+1}$. Here, n is an integer of 8 to 18, preferably an integer of 8 to 15, more preferably an integer of 8 to 14, and even more preferably an integer of 8 to 13. The (meth)acrylic acid ester represented by the general formula (I) is preferably lauryl (meth)acrylate or octyl (meth)acrylate, and more preferably lauryl methacrylate or octyl methacrylate.

As a result, when synthesizing the above modified polyolefin resin, the generation of homopolymers of the component (C) is suppressed, and a highly efficient graft reaction can be realized between the polyolefin resin (component (A)), the component (B), and the component (C). Therefore, the solvent solubility of the obtained modified polyolefin resin and the low-temperature stability of the solution can be improved. The (meth)acrylic acid esters represented by the general formula (I) can be used singly or as a mixture of two or more at any ratio.

The graft weight of the component (C) in the modified polyolefin resin is preferably in the range of 0.1 to 10 wt. %, and more preferably in the range of 0.5 to 7 wt. % when the amount of the modified polyolefin resin is taken as 100 wt. %. When the graft weight of the component (C) is 0.1 wt. % or more, a highly efficient graft reaction can be realized, and therefore, the solvent solubility, the low-temperature stability of the solution, etc., can be well maintained. Further, the introduction of polar moieties into the polymer contributes to the improvement of the adhesion to the hard coat layer. In addition, when the graft weight % of the component (C) is 10 wt. % or less, the formation of unreacted grafts can be prevented. The graft weight % of the component (C) is the percentage of component (C) units actually grafted on the polymer chain when the amount of the modified polyolefin resin is taken as 100 wt. %.

The graft weight % of the component (C) can be measured by a known method. For example, it can be determined by Fourier transform infrared spectroscopy or $^1$H-NMR (proton nuclear magnetic resonance) analysis.

In the present invention, graft components other than the components (B) and (C) may be used in combination, as long as the effects of the present invention are not impaired. Examples of usable graft components include (meth)acrylic acid, (meth)acrylic acid derivatives other than the component (C) (e.g., N-methyl (meth)acrylamide, hydroxyethyl (meth)acrylamide, and (meth)acryloylmorpholine), and the like. The graft components other than the components (B) and (C) in the modified polyolefin resin of the present invention may be used singly or in combination of two or more. It is preferable that the total graft weight of the graft components other than the components (B) and (C) does not exceed the total graft weight of the components (B) and (C).

The modified polyolefin resin of the present invention can be obtained by graft-polymerizing the polyolefin resin (component (A)) with at least the components (B) and (C). The method for synthesizing the modified polyolefin resin can be carried out by a known method, and a radical generator (hereinafter also simply referred to as "the component (D)") may be used in the production thereof. Such a method is, for example, a solution method in which a mixture of the components (A), (B), and (C) is dissolved by heating in an organic solvent such as toluene, and the component (D) is added thereto; or a method of adding the components (A), (B), (C), and (D) using a kneading machine such as a Banbury mixer, kneader, or extruder, to obtain a modified polyolefin resin by a melt-kneading reaction under heating. In the case of the latter method, the components (A), (B), (C), and (D) may be added all at once or sequentially.

The radical generator as the component (D) can be suitably selected from known radical generators; however, an organic peroxide compound is particularly preferable. Examples of such organic peroxide compounds include di-t-butyl peroxide, dicumyl peroxide, t-butyl cumyl peroxide, benzoyl peroxide, dilauryl peroxide, cumene hydroperoxide, t-butyl hydroperoxide, 1,4-bis [(t-butylperoxy)isopropyl]benzene, 1,1-bis(t-butylperoxy)-3,5,5-trimethylcyclohexane, 1,1-bis(t-butylperoxy)-cyclohexane, cyclohexanone peroxide, t-butylperoxybenzoate, t-butylperoxyisobutyrate, t-butylperoxy-3,5,5-trimethylhexanoate, t-butylperoxy-2-ethylhexanoate, t-butylperoxyisopropyl carbonate, cumyl peroxyoctoate, and the like; preferred among these are di-t-butyl peroxide, dicumyl peroxide, and dilauryl peroxide. The component (D) may be a single radical generator or a combination of a plurality of types of radical generators.

The amount of the component (D) added in the graft polymerization reaction is preferably 1 to 100 wt. %, and more preferably 10 to 50 wt. %, based on the sum (weight) of the amount of the component (B) added and the amount of the component (C) added. Sufficient graft efficiency can be maintained when the amount of the component (D) added is 1 wt. % or more. Further, when the amount of the component (D) added is 100 wt. % or less, it is possible to prevent a decrease in the weight average molecular weight (Mw) of the modified polyolefin resin.

In the present invention, the weight average molecular weight (Mw) of the modified polyolefin resin used in the primer layer is preferably in the range of 40,000 to 150,000. The present inventors found that since the graft weight of the α,β-unsaturated carboxylic acid or derivative thereof was in the range of 0.4 to 7 wt. % when the amount of the modified polyolefin resin was taken as 100 wt. %, and more preferably the weight average molecular weight (Mw) of the obtained modified polyolefin resin was in the range of 40,000 to 150,000, when this modified polyolefin resin was used in the primer layer, the adhesion to the hard coat layer could be further improved when using a cycloolefin polymer film as the base material. When the weight average molecular weight (Mw) of the modified polyolefin resin is 40,000 or more, it is possible to improve the adhesion to the hard coat layer by using the obtained modified polyolefin resin in the primer layer. Further, when the weight average molecular weight (Mw) of the modified polyolefin resin is 150,000 or less, sufficient solvent solubility can be obtained.

In the present invention, the weight average molecular weight (Mw) of the modified polyolefin resin refers to a value measured and calculated by gel permeation chromatography (GPC) (standard substance: polystyrene).

Moreover, the modified polyolefin resin of the present invention preferably has a melting point (Tm) in the range of 60° C. to 90° C., for example. The present inventors found that since the graft weight of the α,β-unsaturated carboxylic acid or derivative thereof was in the range of 0.4 to 7 wt. % when the amount of the modified polyolefin resin was taken as 100 wt. %, and more preferably the melting point (Tm) of the obtained modified polyolefin resin was in the range of 60° C. to 90° C., when this modified polyolefin resin was used in the primer layer, the adhesion to the hard coat layer could be further improved when using a cycloolefin polymer film as the base material. When the melting point (Tm) is 60° C. or more, it is possible to improve the adhesion to the hard coat layer by using this modified polyolefin resin in the primer layer. If the melting point (Tm) exceeds 90° C., when this modified polyolefin resin is used as a primer layer paint to form a coating film on the base film, the film-forming properties are inferior. For this reason, the melting point (Tm) of the modified polyolefin resin is preferably 90° C. or less.

In the present invention, the melting point (Tm) of the modified polyolefin resin can be measured, for example, by using a differential scanning calorimeter (DSC) under the conditions according to JIS K7121-1987. Specifically, for example, the measurement can be performed under the following conditions.

According to JIS K7121-1987, using a DSC measuring device (produced by Seiko Instruments Inc.), about 5 mg of a sample is kept in a heated and melted state at 150° C. for 10 minutes, and the temperature is then lowered at a rate of 10° C./min and stably held at −50° C. Then, the temperature is raised to 150° C. at 10° C./min for melting. The melting peak temperature at that time is measured, and this temperature is evaluated as Tm.

Moreover, the modified polyolefin resin of the present invention preferably has a glass transition temperature (Tg) in the range of −30° C. to −10° C., for example. The present inventors found that since the graft weight of the α,β-unsaturated carboxylic acid or derivative thereof was in the range of 0.4 to 7 wt. % when the amount of the modified polyolefin resin was taken as 100 wt. %, and more preferably the glass transition temperature (Tg) of the obtained modified polyolefin resin was in the range of −30° C. to −10° C., when this modified polyolefin resin was used in the primer layer, the adhesion to the hard coat layer could be further improved when using a cycloolefin polymer film as the base material. When the glass transition temperature (Tg) is −10° C. or less, it is possible to improve the adhesion to the hard coat layer by using this modified polyolefin resin in the primer layer. Further, if the glass transition temperature (Tg) is less than −30° C., when this modified polyolefin resin is used as a primer layer paint, the coating film of the primer layer formed on the base film is so soft that cracks are likely to occur in the hard coat layer laminated on the primer layer. For this reason, the glass transition temperature (Tg) is preferably −30° C. or more.

In the present invention, the glass transition temperature (Tg) of the modified polyolefin resin refers to a numerical value obtained by measurement under the conditions according to JIS K7121-1987 using a differential scanning calorimeter (DSC). Specifically, for example, the measurement can be performed under the following conditions.

According to JIS K7121-1987, using a DSC measuring device (produced by Seiko Instruments Inc.), about 5 mg of a sample is kept in a heated and melted state at 150° C. for 10 minutes, and the temperature is then lowered at a rate of 10° C./min and stably held at −50° C. Then, the temperature is raised to 150° C. at 10° C./min, and the intersection of the baseline of the DSC curve and the tangent of the inflection point of glass transition is evaluated as Tg.

In the present invention, the specific modified polyolefin resin described above is used as the resin constituting the primer layer; however, other resins, for example, acrylic resins such as styrene acrylic resin and methyl methacrylate resin, epoxy resins, isocyanate resins, and fibrous resins, may be used in combination as long as the actions and effects of the present invention are not impaired.

The primer layer may contain inorganic or organic fine particles, from the viewpoint of preventing blocking between film surfaces.

Examples of inorganic fine particles include fine particles of alumina, zinc oxide, silica, titanium oxide, cerium oxide, or the like. Examples of organic fine particles include fine particles of acrylic, melamine-formaldehyde condensate, polyethylene, styrene acrylic, polyester, or the like. It is preferable to use fine particles having a particle diameter of 0.05 µm to 0.20 µm, for example.

Moreover, the primer layer can be mixed with a leveling agent for the purpose of adjusting the surface characteristics and improving the coating properties. Usable examples thereof include known leveling agents, such as fluorine leveling agents, acrylic leveling agents, siloxane leveling agents, and adducts or mixtures thereof. The mixing amount is suitably determined depending on, for example, the adjustment of the surface characteristics and the coating properties.

In addition, as other additives to be added to the primer layer, ultraviolet absorbers, defoamers, antifouling agents, antioxidants, antistatic agents, light stabilizers, and the like may be mixed as needed, as long as the effects of the present invention are not impaired.

The coating thickness of the primer layer in the present invention is not particularly limited, but is preferably in the range of 0.1 µm to 5.0 nm, which does not adversely affect the adhesion between the base film and the hard coat layer, or the pencil hardness of the hard coat layer. The coating thickness of the primer layer can be measured by actual measurement with a micrometer.

In the present invention, the primer layer is formed by applying a paint (primer layer paint), which is obtained by dissolving or dispersing the resin forming the primer layer, and inorganic or organic fine particles, a leveling agent, other additives, etc., as needed in a suitable organic solvent, to the cycloolefin polymer film (base film), followed by drying. In this case, the organic solvent can be suitably selected depending on the solubility of the resin contained therein. From the viewpoint of the solvent being capable of uniformly dissolving or dispersing at least the solids (resin and other additives), workability during coating, and drying properties, it is preferable to use, for example, an organic solvent having a boiling point of 50° C. to 160° C. Examples of such organic solvents include aromatic solvents such as toluene, xylene, and n-heptane; aliphatic solvents such as cyclohexane, methylcyclohexane, and ethylcyclohexane; ester solvents such as methyl acetate, ethyl acetate, propyl acetate, isopropyl acetate, butyl acetate, and methyl lactate; ketone solvents such as acetone, methyl ethyl ketone, methyl isobutyl ketone, and cyclohexanone; alcohol solvents such as methanol, ethanol, isopropyl alcohol, n-propyl alcohol, and butanol; and other known organic solvents. These solvents can be used singly or in combination of two or more.

In the present invention, as the method for applying the primer layer paint to the base film, the primer layer paint can be applied by a known coating method such as gravure coating, micro-gravure coating, fountain bar coating, slide die coating, slot die coating, a screen printing method, or a spray coating method. The paint applied to the cycloolefin polymer film is generally dried at a temperature of about 50 to 120° C., while suitably adjusting the drying conditions (temperature in the drying furnace, wind speed in the furnace, drying time, etc.), to remove the solvent, thereby forming a coating film.

[Hard Coat Layer]

Next, the hard coat layer of the hard coat film will be described. In the present invention, as the resin contained in the hard coat layer, any resin can be used without limitation as long as it forms a film. In particular, it is preferable to use an ionizing radiation curable resin because surface hardness (pencil hardness and scratch resistance) can be imparted to the hard coat layer, the degree of crosslinking can be adjusted by the amount of UV exposure, and the surface hardness of the hard coat layer can be adjusted.

The ionizing radiation curable resin used in the present invention is not particularly limited, as long as it is a transparent resin that is cured by irradiation with ultraviolet rays (hereinafter abbreviated as "UV") or electron beams (hereinafter abbreviated as "EB"); however, in terms of the coating film hardness and the hard coat layer forming a three-dimensional crosslinked structure, resins comprising a UV- or EB-curable polyfunctional acrylate having three or more (meth)acryloyloxy groups per molecule are preferable. Specific examples of the UV- or EB-curable polyfunctional acrylate having three or more (meth)acryloyloxy groups per molecule include trimethylolpropane tri(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane ethoxy triacrylate, glycerin propoxy triacrylate, ditrimethylolpropane tetraacrylate, and the like. The polyfunctional acrylates may be used not only singly but also as a mixture of two or more.

Further, the ionizing radiation curable resin used in the present invention is preferably a polymer having a weight average molecular weight (Mw) in the range of 700 to 3600, more preferably a weight average molecular weight in the range of 700 to 3000, and even more preferably a weight average molecular weight of 700 to 2400. If the weight average molecular weight is less than 700, the curing shrinkage is large during curing by UV or EB irradiation, a phenomenon in which the hard coat film warps to the hard coat layer surface side (curling) increases, defects occur in the subsequent processing steps, and processing suitability is poor. Moreover, it is not suitable that the weight average molecular weight exceeds 3600, because the flexibility of the hard coat layer increases, but the hardness is insufficient.

Moreover, when the weight average molecular weight of the ionizing radiation curable resin used in the present invention is less than 1500, the number of functional groups per molecule is preferably 3 or more and less than 10. In contrast, when the weight average molecular weight of the ionizing radiation curable resin is 1500 or more, the number of functional groups per molecule is preferably 3 or more and 20 or less. Within the above ranges, curling can be suppressed while suppressing the occurrence of cracks under heat-resistant conditions (stored at 100° C. for 5 minutes), and suitable processing suitability can be maintained.

Further, as the resin contained in the hard coat layer, in addition to the ionizing radiation curable resins described above, thermoplastic resins such as polyethylene, polypropylene, polystyrene, polycarbonate, polyester, acrylic, styrene-acrylic, and fibrin, and thermosetting resins such as phenol resin, urea resin, unsaturated polyester, epoxy, and silicon resin may be mixed within the range that does not impair the hardness and scratch resistance of the hard coat layer.

Moreover, it is possible to further improve the surface hardness (scratch resistance) by incorporating inorganic oxide fine particles into the hard coat layer. In this case, the average particle diameter of the inorganic oxide fine particles is preferably in the range of 5 to 50 nm, and more preferably in the range of 10 to 20 nm. If the average particle diameter is less than 5 nm, it is difficult to obtain sufficient surface hardness. In contrast, if the average particle diameter exceeds 50 nm, the gloss and transparency of the hard coat layer are likely to be lowered, and the flexibility may also be lowered.

In the present invention, examples of the inorganic oxide fine particles include alumina, silica, and the like. Among these, alumina containing aluminum as a main component is particularly preferable because it has high hardness, and is thus effective with a smaller addition amount than silica.

In the present invention, the content of the inorganic oxide fine particles is preferably 0.1 to 10.0 parts by weight based on 100 parts by weight of the ionizing radiation curable resin in the hard coat layer. If the content of the inorganic oxide fine particles is less than 0.1 parts by weight, it is difficult to obtain an effect of improving the surface hardness (scratch resistance). In contrast, if the content exceeds 10.0 parts by weight, the haze increases, which is not preferable.

The hard coat paint for forming the hard coat layer may contain a photopolymerization initiator. Usable examples of such photopolymerization initiators include commercially available acetophenones such as Omnirad 651 and Omnirad 184 (trade names: produced by IGM Resins); and benzophenones such as Omnirad 500 (trade name: produced by IGM Resins).

A leveling agent can be used in the hard coat layer for the purpose of improving the coating properties. Usable examples thereof include known leveling agents such as fluorine leveling agents, acrylic leveling agents, siloxane leveling agents, and adducts or mixtures thereof. The mixing amount can be set in the range of 0.03 parts by weight to 3.0 parts by weight based on 100 parts by weight of the solid content of the resin in the hard coat layer. Moreover, in touch panel applications etc., when adhesiveness using an optical transparent adhesive OCR is required for the purpose of adhesion to cover glass (CG), transparent conductive members (TSP), liquid crystal modules (LCM), etc., of touch panel terminals, it is preferable to use an acrylic leveling agent or fluorine leveling agent having a high surface free energy (approximately 40 mN/m or more).

As other additives to be added to the hard coat layer, ultraviolet absorbers, defoamers, surface tension-adjusting agents, antifouling agents, antioxidants, antistatic agents, light stabilizers, and the like may be mixed as needed, as long as the effects of the present invention are not impaired.

Regarding the hard coat layer, a hard coat paint which is obtained by dissolving or dispersing the ionizing radiation curable resin described above, as well as a photopolymerization initiator, other additives, etc., in a suitable solvent, is applied to the primer layer and then dried, followed by irradiation with ionizing radiation such as UV or EB to induce photopolymerization, whereby a hard coat layer having excellent hardness can be obtained. The solvent can be suitably selected according to the solubility of the resin to be mixed, and may be any solvent that can uniformly dissolve or disperse at least the solids (resin, photopolymerization initiator, other additives, etc.). Examples of such solvents include aromatic solvents such as toluene, xylene, and n-heptane; aliphatic solvents such as cyclohexane, methylcyclohexane, and ethylcyclohexane; ester solvents such as methyl acetate, ethyl acetate, propyl acetate, isopropyl acetate, butyl acetate, and methyl lactate; ketone solvents such as acetone, methyl ethyl ketone, methyl isobutyl ketone, and cyclohexanone; alcohol solvents such as methanol, ethanol, isopropyl alcohol, and n-propyl alcohol; and other known organic solvents. These solvents can be used singly or in combination of two or more.

The method for applying the hard coat paint that forms the hard coat layer is not particularly limited; however, the hard coat paint is applied by a known coating method, such as gravure coating, micro-gravure coating, fountain bar coating, slide die coating, slot die coating, a screen printing method, or a spray coating method, and then generally dried at a temperature of about 50 to 120° C.

The coating thickness of the hard coat layer is not particularly limited, but is preferably in the range of, for example, 1.0 μm to 5.0 μm, and more preferably in the range of 1.5 μm to 3.5 μm. It is not preferable that the coating thickness is less than 1.0 μm, because the required scratch resistance is reduced, and the pencil hardness is reduced. It is also not preferable that the coating thickness exceeds 5.0 μm, because strong curling is likely to occur, and the handling properties are lowered in the production process etc. The coating film thickness of the hard coat layer can be measured by actual measurement with a micrometer.

[Method for Producing Hard Coat Film]

The present invention also provides a method for producing a hard coat film having the configuration described above.

That is, the method for producing a hard coat film according to the present invention is a method for producing a hard coat film having a hard coat layer containing an ionizing radiation curable resin on a cycloolefin polymer base film through a primer layer, the method comprising:

applying a primer layer paint to the cycloolefin polymer base film, followed by drying to form a primer layer, wherein the primer layer paint contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof is in the range of 0.4 to 7 wt. % when the amount of the modified polyolefin resin is taken as 100 wt. %;

then applying a hard coat layer paint containing an ionizing radiation curable resin to the primer layer, followed by drying to form a hard coat layer; and then performing ionizing radiation irradiation (the tenth invention described above).

Further, the method for producing a hard coat film according to the present invention is the method for producing a hard coat film according to the tenth invention described above, wherein the modified polyolefin resin has a weight average molecular weight in the range of 40,000 to 150,000 (the eleventh invention described above).

Further, the method for producing a hard coat film according to the present invention is the method for producing a hard coat film according to the tenth invention described above, wherein the modified polyolefin resin has a melting point in the range of 60° C. to 90° C. (the twelfth invention described above).

Further, the method for producing a hard coat film according to the present invention is the method for producing a hard coat film according to the tenth invention described above, wherein the modified polyolefin resin has a glass transition temperature in the range of −30° C. to −10° C. (the thirteenth invention described above).

Further, the method for producing a hard coat film according to the present invention is a method for producing a hard coat film having a hard coat layer containing an ionizing radiation curable resin on a cycloolefin polymer base film through a primer layer, the method comprising:

applying a primer layer paint to the cycloolefin polymer base film, followed by drying to form a primer layer, wherein the primer layer paint contains a modified polyolefin resin in which a propylene-ethylene copolymer is graft-modified with an α,β-unsaturated carboxylic acid or a derivative thereof, and a (meth)acrylic acid ester;

then applying a hard coat layer paint containing an ionizing radiation curable resin to the primer layer, followed by drying to form a hard coat layer; and then performing ionizing radiation irradiation (the fifteenth invention described above).

The details of the modified polyolefin resin are as described above. Further, the preparation of the primer layer paint and the hard coat layer paint, the coating methods of these paints, the drying methods of the resulting coating films, etc., are also as described above. Moreover, the exposure dose of ionizing radiation (UV, EB, etc.) after the formation of the hard coat layer may be an exposure dose required to impart sufficient hardness to the hard coat layer, and can be suitably set depending on, for example, the type of ionizing radiation curable resin.

Further, the above polyolefin resin is preferably a propylene-ethylene copolymer, for example.

Moreover, the α,β-unsaturated carboxylic acid or derivative thereof is preferably one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

As described above in detail, according to the present invention, a hard coat layer containing an ionizing radiation curable resin is laminated on at least one surface of a cycloolefin polymer base film through a primer layer, wherein the primer layer contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof in this modified polyolefin resin is in the range of 0.4 to 7 wt. % when the amount of the modified polyolefin resin is taken as 100 wt. %, whereby it is possible to obtain a hard coat film having excellent adhesion to a hard coat layer when using a cycloolefin polymer film as a base material.

Furthermore, since the modified polyolefin resin has a weight average molecular weight in the range of 40,000 to 150,000, the use of the modified polyolefin resin in the primer layer can further improve the adhesion to the hard coat layer when using a cycloolefin polymer film as the base material.

Furthermore, since the modified polyolefin resin has a melting point in the range of 60° C. to 90° C., the use of the modified polyolefin resin in the primer layer can further improve the adhesion to the hard coat layer when using a cycloolefin polymer film as the base material.

Furthermore, since the modified polyolefin resin has a glass transition temperature in the range of −30° C. to −10° C., the use of the modified polyolefin resin in the primer layer can further improve the adhesion to the hard coat layer when using a cycloolefin polymer film as the base material.

EXAMPLES

Next, embodiments of the present invention will be described in more detail with reference to the Examples; however, the present invention is not limited to the following Examples.

Unless otherwise specified, "parts" and "%" described below represent "parts by weight" and "wt. %," respectively.

The following Examples 1 to 7 are examples corresponding to the first and second inventions described above.

Example 1

<Production of Modified Polyolefin Resin 1>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 60,000, Tm=65° C.), was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 1, in which the weight average molecular weight was 50,000, Tm=65° C., Tg=−27° C., the graft weight of maleic anhydride was 3.2 wt. %, and the graft weight of lauryl methacrylate was 2.0 wt. %. The graft weight of maleic anhydride was measured by an alkali titration method, and the graft weight of lauryl methacrylate was measured by $^1$H-NMR. The weight average molecular weight (Mw) is a value measured and calculated by the gel permeation chromatography (GPC) (standard substance: polystyrene) described above, and the melting point (Tm) and glass transition temperature (Tg) are values measured by the differential scanning calorimeter (DSC) described above. The measurement was carried out by the same method in the following Examples and the like.

<Preparation of Primer Layer Paint>

The modified polyolefin resin 1 produced as described above was diluted with butyl acetate/toluene=85/15 (wt. %) until the solid content concentration (paint concentration) was 5.5% to prepare a primer layer paint.

<Preparation of Hard Coat Layer Paint>

Using 100 parts of the urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of Omnirad 184 (a photopolymerization initiator, produced by IGM Resins), 2.5 parts of TINUVIN 292 (a hindered amine light stabilizer, produced by BASF), and 0.3 parts of the leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Hard Coat Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

Next, the above hard coat layer paint was applied to the primer layer of the above primer layer coating film using a bar coater (#6), followed by hot-air drying in a drying furnace at 80° C. for 1 minute to form a coating layer with a coating film thickness of 2.5 µm. This layer was cured using a UV irradiation device set at a height of 60 mm from the coating surface at a UV dose of 180 mJ/cm$^2$ to form a hard coat layer, thereby producing a hard coat film of the present Example. The formation thicknesses of the coating films of the primer layer and the hard coat layer were measured using the Thin-Film Analyzer F20 (trade name) (produced by FILMETRICS).

Example 2

<Production of Modified Polyolefin Resin 2>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 1.0 part by weight of maleic anhydride, 1.2 parts by weight of octyl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 2, in which the weight average molecular weight was 70,000, Tm=65° C., Tg=−27° C., the graft weight of maleic anhydride was 0.8 wt. %, and the graft weight of octyl methacrylate was 1.0 wt. %.

<Production of Hard Coat Film>

A hard coat film (Example 2) was produced in the same manner as in Example 1, except that the primer layer paint in which the resin mixed with the primer layer paint of Example 1 was changed to the modified polyolefin resin 2.

Example 3

<Production of Modified Polyolefin Resin 3>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 2.5 parts by weight of maleic anhydride, 1.8 parts by weight of lauryl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 3, in which the weight average molecular weight was 70,000, Tm=65° C., Tg=−27° C., the graft weight of maleic anhydride was 2.2 wt. %, and the graft weight of lauryl methacrylate was 1.6 wt. %.

<Production of Hard Coat Film>

A hard coat film (Example 3) was produced in the same manner as in Example 1, except that the primer layer paint in which the resin mixed with the primer layer paint of Example 1 was changed to the modified polyolefin resin 3.

Example 4

<Production of Modified Polyolefin Resin 4>

In a four-necked flask equipped with a stirrer, a condenser, and a dropping funnel, 100 parts by weight of a propylene-ethylene copolymer (propylene component: 73 wt. %, ethylene component: 27 wt. %, weight average molecular weight: 200,000, Tm=80° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 4, in which the weight average molecular weight was 90,000, Tm=80° C., Tg=−29° C., the graft weight of maleic anhydride was 3.1 wt. %, and the graft weight of octyl methacrylate was 2.0 wt. %.

<Production of Hard Coat Film>

A hard coat film (Example 4) was produced in the same manner as in Example 1, except that the primer layer paint in which the resin mixed with the primer layer paint of Example 1 was changed to the modified polyolefin resin 4.

Example 5

<Production of modified polyolefin resin 5>

In a four-necked flask equipped with a stirrer, a condenser, and a dropping funnel, 100 parts by weight of a propylene-ethylene copolymer (propylene component: 80 wt. %, ethylene component: 20 wt. %, weight average molecular weight: 170,000, Tm=72° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 5, in which the weight average molecular weight was 80,000, Tm=72° C., Tg=−29° C., the graft weight of maleic anhydride was 3.2 wt. %, and the graft weight of octyl methacrylate was 2.1 wt. %.

<Production of Hard Coat Film>

A hard coat film (Example 5) was produced in the same manner as in Example 1, except that the primer layer paint in which the resin mixed with the primer layer paint of Example 1 was changed to the modified polyolefin resin 5.

Example 6

<Production of Modified Polyolefin Resin 6>

In a four-necked flask equipped with a stirrer, a condenser, and a dropping funnel, 100 parts by weight of a propylene-ethylene copolymer (propylene component: 89 wt. %, ethylene component: 11 wt. %, weight average molecular weight: 300,000, Tm=60° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 6, in which the weight average molecular weight was 140,000, Tm=60° C., Tg=−25° C., the graft weight of maleic anhydride was 3.1 wt. %, and the graft weight of lauryl methacrylate was 2.0 wt. %.

<Production of Hard Coat Film>

A hard coat film (Example 6) was produced in the same manner as in Example 1, except that the primer layer paint in which the resin mixed with the primer layer paint of Example 1 was changed to the modified polyolefin resin 6.

Example 7

<Production of Modified Polyolefin Resin 7>

In a four-necked flask equipped with a stirrer, a condenser, and a dropping funnel, 100 parts by weight of a propylene-ethylene-1-butene copolymer (propylene component: 57 wt. %, ethylene component: 31 wt. %, 1-butene component: 12 wt. %, weight average molecular weight: 220,000, Tm=85° C.) was dissolved by heating in 400 g of toluene. Then, while maintaining the temperature in the system at 110° C. and stirring, 8.0 parts by weight of maleic anhydride, 8.0 parts by weight of octyl methacrylate, and 4.5 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 7, in which the weight average molecular weight was 100,000, Tm=85° C., Tg=−28° C., the graft weight of maleic anhydride was 6.2 wt. %, and the graft weight of octyl methacrylate was 6.5 wt. %.

<Production of Hard Coat Film>

A hard coat film (Example 7) was produced in the same manner as in Example 1, except that the primer layer paint in which the resin mixed with the primer layer paint of Example 1 was changed to the modified polyolefin resin 7.

The following Comparative Example 1 is a comparative example for the first and second inventions described above.

Comparative Example 1

<Production of Modified Polyolefin Resin (Comparative Example 1)>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 10 parts by weight of maleic anhydride, 6.5 parts by weight of lauryl methacrylate, and 3.6 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin (Comparative Example 1), in which the weight average molecular weight was 90,000, Tm=65° C., Tg=−27° C., the graft weight of maleic anhydride was 8.1 wt. %, and the graft weight of lauryl methacrylate was 4.9 wt. %.

<Production of Hard Coat Film>

A hard coat film (Comparative Example 1) was produced in the same manner as in Example 1, except that the primer layer paint in which the resin mixed with the primer layer paint of Example 1 was changed to the above modified polyolefin resin (Comparative Example 1).

The hard coat films of the Examples and Comparative Example produced as described above were each evaluated for the following items, and the results were summarized in Table 1.

(1) Adhesion

The adhesion was evaluated according to JIS-K5600-5-6. Specifically, 100 cross-cuts of 1 mm$^2$ were produced from each hard coat film using a cross-cut peel test jig under ordinary conditions, i.e., constant temperature and humidity conditions (23° C., 50% RH). Adhesive tape No. 252 produced by Sekisui Chemical Co., Ltd. was attached thereto, pressed uniformly with a spatula, and peeled in the direction of 60 degrees, and the number of remaining hard coat layers was evaluated as the residual ratio. When the residual ratio of the hard coat layers was 90% or more (number of remaining hard coat layers: 90), the adhesion was determined to be acceptable.

(2) Pencil Hardness

The pencil hardness of each hard coat film was measured by the test method according to JIS-K-5600-5-4. Hardness without formation of scratches on the surface was measured. Regarding the evaluation criteria, a hardness of 3B or more was regarded as acceptable.

(3) Scratch Resistance

The hard coat layer surface of each hard coat film was subjected to 10 reciprocating frictions using steel wool #0000 at a load of 1 kg by the test method according to JIS-K-5600-5-10, and the degree of scratching was evaluated according to the following criteria. The scratch resistance of products evaluated as ○ was regarded as excellent. Products evaluated as Δ are also usable as products.

○: No scratches occurred
Δ: Slight scratches occurred
x: Innumerable scratches occurred

TABLE 1

| | Primer layer material | | | | | | | | |
|---|---|---|---|---|---|---|---|---|---|
| | Resin structure | | Graft weight of component (B) (wt. %) | Mw (ten-thousands) | Melting point (° C.) | Tg (° C.) | Adhesion | Pencil hardness | Scratch resistance |
| | Constituent | Component ratio (wt. %) | | | | | | | |
| Example 1 | Propylene-ethylene | 88/12 | 3.2 | 5 | 65 | −27 | Acceptable | Acceptable | ○ |
| Example 2 | Propylene-ethylene | 88/12 | 0.8 | 7 | 65 | −27 | Acceptable | Acceptable | ○ |
| Example 3 | Propylene-ethylene | 88/12 | 2.2 | 7 | 65 | −27 | Acceptable | Acceptable | ○ |
| Example 4 | Propylene-ethylene | 73/27 | 3.1 | 9 | 80 | −29 | Acceptable | Acceptable | ○ |
| Example 5 | Propylene-ethylene | 80/20 | 3.2 | 8 | 72 | −29 | Acceptable | Acceptable | ○ |
| Example 6 | Propylene-ethylene | 89/11 | 3.1 | 14 | 60 | −25 | Acceptable | Acceptable | ○ |
| Example 7 | Propylene-ethylene-butene | 57/31/12 | 6.2 | 10 | 85 | −28 | Acceptable | Acceptable | ○ |

TABLE 1-continued

| | Primer layer material | | | | | | | | |
|---|---|---|---|---|---|---|---|---|---|
| | Resin structure | | Graft weight of component | Mw | Melting | | | | |
| | Constituent | Component ratio (wt. %) | (B) (wt. %) | (ten-thousands) | point (° C.) | Tg (° C.) | Adhesion | Pencil hardness | Scratch resistance |
| Comparative Example 1 | Propylene-ethylene | 88/12 | 8.1 | 9 | 65 | −27 | Failed | Unmeasurable | ○ |

As is clear from the results of Table 1 above, according to the hard coat films of the Examples which uses, in the primer layer, the modified polyolefin resin of the present invention in which the graft weight of the α,β-unsaturated carboxylic acid or derivative thereof is within the range of the present invention when the amount of the modified polyolefin resin is taken as 100 wt. %, and the weight average molecular weight is within the range of the present invention, a hard coat film having excellent adhesion to a hard coat layer can be obtained when using a cycloolefin polymer film as a base material. Moreover, according to the Examples of the present invention, a hard coat film comprising a hard coat layer with excellent hardness (pencil hardness and scratch resistance) can be obtained.

In contrast, the hard coat film of the Comparative Example, which uses, in the primer layer, a modified polyolefin resin in which at least one of the graft weight of the α,β-unsaturated carboxylic acid or derivative thereof and the weight average molecular weight is out of the range of the present invention, has inferior adhesion, and its hard coat layer is likely to have adhesion failure. In the hard coat film of the Comparative Example, the above pencil hardness test could not be properly evaluated due to the adhesion failure of the hard coat layer.

The following Examples 8 to 14 are examples corresponding to the first and third inventions described above.

Example 8

<Production of Modified Polyolefin Resin 8>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 60,000, Tm=65° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 8, in which the weight average molecular weight was 50,000, Tm=65° C., Tg=−27° C., the graft weight of maleic anhydride was 3.2 wt. %, and the graft weight of lauryl methacrylate was 2.0 wt. %. The graft weight of maleic anhydride was measured by an alkali titration method, and the graft weight of lauryl methacrylate was measured by $^1$H-NMR. The weight average molecular weight (Mw) is a value measured and calculated by gel permeation chromatography (GPC) (standard substance: polystyrene) described above, and the melting point (Tm) and glass transition temperature (Tg) are values measured by the differential scanning calorimeter (DSC) described above. The measurements were carried out by the same method in the following Examples and the like.

<Preparation of Primer Layer Paint>

The modified polyolefin resin 8 produced as described above was diluted with butyl acetate/toluene=85/15 (wt. %) until the solid content concentration (paint concentration) was 5.5% to prepare a primer layer paint.

<Preparation of Hard Coat Layer Paint>

Using 100 parts of the urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of Omnirad 184 (a photopolymerization initiator, produced by IGM Resins), 2.5 parts of TINUVIN 292 (a hindered amine light stabilizer, produced by BASF), and 0.3 parts of the leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Hard Coat Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

Next, the above hard coat layer paint was applied to the primer layer of the above primer layer coating film using a bar coater (#6), followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 9

<Production of Modified Polyolefin Resin 9>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 1.0 part by weight of maleic anhydride, 1.2 parts by weight of octyl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 9, in which the weight average molecular weight was 70,000, Tm=65° C., Tg=−27° C., the graft weight of maleic anhydride was 0.8 wt. %, and the graft weight of octyl methacrylate was 1.0 wt. %.

<Production of Hard Coat Film>

A hard coat film (Example 9) was produced in the same manner as in Example 8, except that the primer layer paint in which the resin mixed with the primer layer paint of Example 8 was changed to the modified polyolefin resin 9.

Example 10

<Production of Modified Polyolefin Resin 10>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 2.5 parts by weight of maleic anhydride, 1.8 parts by weight of lauryl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 10, in which the weight average molecular weight was 70,000, Tm=65° C., Tg=−27° C., the graft weight of maleic anhydride was 2.2 wt. %, and the graft weight of lauryl methacrylate was 1.6 wt. %.

<Production of Hard Coat Film>

A hard coat film (Example 10) was produced in the same manner as in Example 8, except that the primer layer paint in which the resin mixed with the primer layer paint of Example 8 was changed to the modified polyolefin resin 10.

Example 11

<Production of Modified Polyolefin Resin 11>

In a four-necked flask equipped with a stirrer, a condenser, and a dropping funnel, 100 parts by weight of a propylene-ethylene copolymer (propylene component: 73 wt. %, ethylene component: 27 wt. %, weight average molecular weight: 200,000, Tm=80° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 11, in which the weight average molecular weight was 90,000, Tm=80° C., Tg=−29° C., the graft weight of maleic anhydride was 3.1 wt. %, and the graft weight of octyl methacrylate was 2.0 wt. %.

<Production of Hard Coat Film>

A hard coat film (Example 11) was produced in the same manner as in Example 8, except that the primer layer paint in which the resin mixed with the primer layer paint of Example 8 was changed to the modified polyolefin resin 11.

Example 12

<Production of Modified Polyolefin Resin 12>

In a four-necked flask equipped with a stirrer, a condenser, and a dropping funnel, 100 parts by weight of a propylene-ethylene copolymer (propylene component: 80 wt. %, ethylene component: 20 wt. %, weight average molecular weight: 170,000, Tm=72° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 12, in which the weight average molecular weight was 80,000, Tm=72° C., Tg=−29° C., the graft weight of maleic anhydride was 3.2 wt. %, and the graft weight of octyl methacrylate was 2.1 wt. %.

<Production of Hard Coat Film>

A hard coat film (Example 12) was produced in the same manner as in Example 8, except that the primer layer paint in which the resin mixed with the primer layer paint of Example 8 was changed to the modified polyolefin resin 12.

Example 13

<Production of Modified Polyolefin Resin 13>

In a four-necked flask equipped with a stirrer, a condenser, and a dropping funnel, 100 parts by weight of a propylene-ethylene copolymer (propylene component: 89 wt. %, ethylene component: 11 wt. %, weight average molecular weight: 300,000, Tm=60° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 13, in which the weight average molecular weight was 140,000, Tm=60° C., Tg=−25° C., the graft weight of maleic anhydride was 3.1 wt. %, and the graft weight of lauryl methacrylate was 2.0 wt. %.

<Production of Hard Coat Film>

A hard coat film (Example 13) was produced in the same manner as in Example 8, except that the primer layer paint in which the resin mixed with the primer layer paint of Example 8 was changed to the modified polyolefin resin 13.

Example 14

<Production of Modified Polyolefin Resin 14>

In a four-necked flask equipped with a stirrer, a condenser, and a dropping funnel, 100 parts by weight of a propylene-ethylene-1-butene copolymer (propylene component: 57 wt. %, ethylene component: 31 wt. %, 1-butene component: 12 wt. %, weight average molecular weight: 220,000, Tm=85° C.) was dissolved by heating in 400 g of toluene. Then, while maintaining the temperature in the system at 110° C. and stirring, 8.0 parts by weight of maleic anhydride, 8.0 parts by weight of octyl methacrylate, and 4.5 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 14, in which the weight average molecular weight was 100,000, Tm=85° C., Tg=−28° C., the graft weight of maleic anhydride was 6.2 wt. %, and the graft weight of octyl methacrylate was 6.5 wt. %.

<Production of Hard Coat Film>

A hard coat film (Example 14) was produced in the same manner as in Example 8, except that the primer layer paint in which the resin mixed with the primer layer paint of Example 8 was changed to the modified polyolefin resin 14.

The following Comparative Example 2 is a comparative example for the first and third inventions described above.

Comparative Example 2

<Production of Modified Polyolefin Resin (Comparative Example 2)>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 10 parts by weight of maleic anhydride, 6.5 parts by weight of lauryl methacrylate, and 3.6 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin (Comparative Example 2), in which the weight average molecular weight was 90,000, Tm=65° C., Tg=−27° C., the graft weight of maleic anhydride was 8.1 wt. %, and the graft weight of lauryl methacrylate was 4.9 wt. %.

<Production of Hard Coat Film>

A hard coat film (Comparative Example 2) was produced in the same manner as in Example 8, except that the primer layer paint in which the resin mixed with the primer layer paint of Example 8 was changed to the above modified polyolefin resin (Comparative Example 2).

The hard coat films of the Examples and Comparative Example produced as described above were each evaluated for the same items in the same manner as in Example 1 etc., and the results were summarized in Table 2.

As is clear from the results of Table 2 above, according to the hard coat films of the Examples, which use, in the primer layer, the modified polyolefin resin of the present invention, in which the graft weight of the α,β-unsaturated carboxylic acid or derivative thereof is within the range of the present invention when the amount of the modified polyolefin resin is taken as 100 wt. %, and the melting point is within the range of the present invention, a hard coat film having excellent adhesion to a hard coat layer can be obtained when using a cycloolefin polymer film as a base material. Moreover, according to the Examples of the present invention, a hard coat film comprising a hard coat layer with excellent hardness (pencil hardness and scratch resistance) can be obtained.

In contrast, the hard coat film of the Comparative Example, which uses, in the primer layer, a modified polyolefin resin in which at least one of the graft weight of the α,β-unsaturated carboxylic acid or derivative thereof and the melting point is out of the range of the present invention, has inferior adhesion, and its hard coat layer is likely to have adhesion failure. In the hard coat film of the Comparative Example, the above pencil hardness test could not be properly evaluated due to the adhesion failure of the hard coat layer.

The following Examples 15 to 21 are examples corresponding to the first and fourth inventions described above.

Example 15

<Production of Modified Polyolefin Resin 15>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 60,000, Tm=65° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 15, in which the weight average molecular weight was 50,000, Tm=65° C., Tg=−27° C., the graft weight of maleic anhydride was 3.2 wt. %, and the graft weight of lauryl methacrylate was 2.0 wt. %. The graft weight of maleic

TABLE 2

| | Primer layer material | | | | | | | | |
|---|---|---|---|---|---|---|---|---|---|
| | Resin structure | | Graft weight of component | Mw | Melting | | | | |
| | Constituent | Component ratio (wt. %) | (B) (wt. %) | (ten-thousands) | point (° C.) | Tg (° C.) | Adhesion | Pencil hardness | Scratch resistance |
| Example 8 | Propylene-ethylene | 88/12 | 3.2 | 5 | 65 | −27 | Acceptable | Acceptable | ○ |
| Example 9 | Propylene-ethylene | 88/12 | 0.8 | 7 | 65 | −27 | Acceptable | Acceptable | ○ |
| Example 10 | Propylene-ethylene | 88/12 | 2.2 | 7 | 65 | −27 | Acceptable | Acceptable | ○ |
| Example 11 | Propylene-ethylene | 73/27 | 3.1 | 9 | 80 | −29 | Acceptable | Acceptable | ○ |
| Example 12 | Propylene-ethylene | 80/20 | 3.2 | 8 | 72 | −29 | Acceptable | Acceptable | ○ |
| Example 13 | Propylene-ethylene | 89/11 | 3.1 | 14 | 60 | −25 | Acceptable | Acceptable | ○ |
| Example 14 | Propylene-ethylene-butene | 57/31/12 | 6.2 | 10 | 85 | −28 | Acceptable | Acceptable | ○ |
| Comparative Example 2 | Propylene-ethylene | 88/12 | 8.1 | 9 | 65 | −27 | Failed | Unmeasurable | ○ | anhydride was measured by an alkali titration method, and the graft weight of lauryl methacrylate was measured by $^1$H-NMR. The weight average molecular weight (Mw) is a value measured and calculated by gel permeation chromatography (GPC) (standard substance: polystyrene) described above, and the melting point (Tm) and glass transition temperature (Tg) are values measured by the differential scanning calorimeter (DSC) described above. The measurement was carried out by the same method in the following Examples and the like.

<Preparation of Primer Layer Paint>

The modified polyolefin resin 15 produced as described above was diluted with butyl acetate/toluene=85/15 (wt. %) until the solid content concentration (paint concentration) was 5.5% to prepare a primer layer paint.

<Preparation of Hard Coat Layer Paint>

Using 100 parts of the urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of Omnirad 184 (a photopolymerization initiator, produced by IGM Resins), 2.5 parts of TINUVIN 292 (a hindered amine light stabilizer, produced by BASF), and 0.3 parts of the leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Hard Coat Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

Next, the above hard coat layer paint was applied to the primer layer of the above primer layer coating film using a bar coater (#6), followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 16

<Production of Modified Polyolefin Resin 16>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 1.0 part by weight of maleic anhydride, 1.2 parts by weight of octyl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 16, in which the weight average molecular weight was 70,000, Tm=65° C., Tg=−27° C., the graft weight of maleic anhydride was 0.8 wt. %, and the graft weight of octyl methacrylate was 1.0 wt. %.

<Production of Hard Coat Film>

A hard coat film (Example 16) was produced in the same manner as in Example 15, except that the primer layer paint in which the resin mixed with the primer layer paint of Example 15 was changed to the modified polyolefin resin 16.

Example 17

<Production of Modified Polyolefin Resin 17>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 2.5 parts by weight of maleic anhydride, 1.8 parts by weight of lauryl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 17, in which the weight average molecular weight was 70,000, Tm=65° C., Tg=−27° C., the graft weight of maleic anhydride was 2.2 wt. %, and the graft weight of lauryl methacrylate was 1.6 wt. %.

<Production of Hard Coat Film>

A hard coat film (Example 17) was produced in the same manner as in Example 15, except that the primer layer paint in which the resin mixed with the primer layer paint of Example 15 was changed to the modified polyolefin resin 17.

Example 18

<Production of Modified Polyolefin Resin 18>

In a four-necked flask equipped with a stirrer, a condenser, and a dropping funnel, 100 parts by weight of a propylene-ethylene copolymer (propylene component: 73 wt. %, ethylene component: 27 wt. %, weight average molecular weight: 200,000, Tm=80° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 18, in which the weight average molecular weight was 90,000, Tm=80° C., Tg=−29° C., the graft weight of maleic anhydride was 3.1 wt. %, and the graft weight of octyl methacrylate was 2.0 wt. %.

<Production of Hard Coat Film>

A hard coat film (Example 18) was produced in the same manner as in Example 15, except that the primer layer paint in which the resin mixed with the primer layer paint of Example 15 was changed to the modified polyolefin resin 18.

Example 19

<Production of Modified Polyolefin Resin 19>

In a four-necked flask equipped with a stirrer, a condenser, and a dropping funnel, 100 parts by weight of a propylene-ethylene copolymer (propylene component: 80 wt. %, ethylene component: 20 wt. %, weight average molecular weight: 170,000, Tm=72° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 19, in which the weight average molecular weight was 80,000, Tm=72° C., Tg=−29° C., the graft weight of maleic anhydride was 3.2 wt. %, and the graft weight of octyl methacrylate was 2.1 wt. %.

<Production of Hard Coat Film>

A hard coat film (Example 19) was produced in the same manner as in Example 15, except that the primer layer paint in which the resin mixed with the primer layer paint of Example 15 was changed to the modified polyolefin resin 19.

Example 20

<Production of Modified Polyolefin Resin 20>

In a four-necked flask equipped with a stirrer, a condenser, and a dropping funnel, 100 parts by weight of a propylene-ethylene copolymer (propylene component: 89 wt. %, ethylene component: 11 wt. %, weight average molecular weight: 300,000, Tm=60° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 20, in which the weight average molecular weight was 140,000, Tm=60° C., Tg=−25° C., the graft weight of maleic anhydride was 3.1 wt. %, and the graft weight of lauryl methacrylate was 2.0 wt. %.

<Production of Hard Coat Film>

A hard coat film (Example 20) was produced in the same manner as in Example 15, except that the primer layer paint in which the resin mixed with the primer layer paint of Example 15 was changed to the modified polyolefin resin 20.

Example 21

<Production of Modified Polyolefin Resin 21>

In a four-necked flask equipped with a stirrer, a condenser, and a dropping funnel, 100 parts by weight of a propylene-ethylene-1-butene copolymer (propylene component: 57 wt. %, ethylene component: 31 wt. %, 1-butene component: 12 wt. %, weight average molecular weight: 220,000, Tm=85° C.) was dissolved by heating in 400 g of toluene. Then, while maintaining the temperature in the system at 110° C. and stirring, 8.0 parts by weight of maleic anhydride, 8.0 parts by weight of octyl methacrylate, and 4.5 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 21, in which the weight average molecular weight was 100,000, Tm=85° C., Tg=−28° C., the graft weight of maleic anhydride was 6.2 wt. %, and the graft weight of octyl methacrylate was 6.5 wt. %.

<Production of Hard Coat Film>

A hard coat film (Example 21) was produced in the same manner as in Example 15, except that the primer layer paint in which the resin mixed with the primer layer paint of Example 15 was changed to the modified polyolefin resin 21.

The following Comparative Example 3 is a comparative example for the first and fourth inventions described above.

Comparative Example 3

<Production of Modified Polyolefin Resin (Comparative Example 3)>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 10 parts by weight of maleic anhydride, 6.5 parts by weight of lauryl methacrylate, and 3.6 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin (Comparative Example 3), in which the weight average molecular weight was 90,000, Tm=65° C., Tg=−27° C., the graft weight of maleic anhydride was 8.1 wt. %, and the graft weight of lauryl methacrylate was 4.9 wt. %.

<Production of Hard Coat Film>

A hard coat film (Comparative Example 3) was produced in the same manner as in Example 15, except that the primer layer paint in which the resin mixed with the primer layer paint of Example 15 was changed to the above modified polyolefin resin Comparative Example 3

The hard coat films of the Examples and Comparative Example produced as described above were each evaluated for the same items in the same manner as in Example 1 etc., and the results were summarized in Table 3.

TABLE 3

| | Primer layer material | | | | | | | | |
|---|---|---|---|---|---|---|---|---|---|
| | Resin structure | | Graft weight of component (B) (wt. %) | Mw (ten-thousands) | Melting point (° C.) | Tg (° C.) | Adhesion | Pencil hardness | Scratch resistance |
| | Constituent | Component ratio (wt. %) | | | | | | | |
| Example 15 | Propylene-ethylene | 88/12 | 3.2 | 5 | 65 | −27 | Acceptable | Acceptable | ○ |
| Example 16 | Propylene-ethylene | 88/12 | 0.8 | 7 | 65 | −27 | Acceptable | Acceptable | ○ |
| Example 17 | Propylene-ethylene | 88/12 | 2.2 | 7 | 65 | −27 | Acceptable | Acceptable | ○ |
| Example 18 | Propylene-ethylene | 73/27 | 3.1 | 9 | 80 | −29 | Acceptable | Acceptable | ○ |
| Example 19 | Propylene-ethylene | 80/20 | 3.2 | 8 | 72 | −29 | Acceptable | Acceptable | ○ |
| Example 20 | Propylene-ethylene | 89/11 | 3.1 | 14 | 60 | −25 | Acceptable | Acceptable | ○ |
| Example 21 | Propylene-ethylene-butene | 57/31/12 | 6.2 | 10 | 85 | −28 | Acceptable | Acceptable | ○ |
| Comparative Example 3 | Propylene-ethylene | 88/12 | 8.1 | 9 | 65 | −27 | Failed | Unmeasurable | ○ |

As is clear from the results of Table 3 above, according to the hard coat films of the Examples, which use, in the primer layer, the modified polyolefin resin of the present invention in which the graft weight of the α,β-unsaturated carboxylic acid or derivative thereof is within the range of the present invention when the amount of the modified polyolefin resin is taken as 100 wt. %, and the glass transition temperature is within the range of the present invention, a hard coat film having excellent adhesion to a hard coat layer can be obtained when using a cycloolefin polymer film as a base material. Moreover, according to the Examples of the present invention, a hard coat film comprising a hard coat layer with excellent hardness (pencil hardness and scratch resistance) can be obtained.

In contrast, the hard coat film of the Comparative Example, which uses, in the primer layer, a modified polyolefin resin in which at least one of the graft weight of the α,β-unsaturated carboxylic acid or derivative thereof and the glass transition temperature is out of the range of the present invention, has inferior adhesion, and its hard coat layer is likely to have adhesion failure. In the hard coat film of the Comparative Example, the above pencil hardness test could not be properly evaluated due to the adhesion failure of the hard coat layer.

The following Examples 22 to 28 are examples corresponding to the sixth invention described above.

Example 22

<Production of Modified Polyolefin Resin 22>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 60,000, Tm=65° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 22, in which the weight average molecular weight was 50,000, Tm=65° C., the graft weight of maleic anhydride was 3.2 wt. %, and the graft weight of lauryl methacrylate was 2.0 wt. %. The graft weight of maleic anhydride was measured by an alkali titration method, and the graft weight of lauryl methacrylate was measured by $^1$H-NMR. The measurement was carried out by the same method in the following Examples and the like.

<Preparation of Primer Layer Paint>

The modified polyolefin resin 22 produced as described above was diluted with butyl acetate/toluene=85/15 (wt. %) until the solid content concentration (paint concentration) was 5.5% to prepare a primer layer paint.

<Preparation of Hard Coat Layer Paint>

Using 100 parts of the urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of Omnirad 184 (a photopolymerization initiator, produced by IGM Resins), 2.5 parts of TINUVIN 292 (a hindered amine light stabilizer, produced by BASF), and 0.3 parts of the leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Hard Coat Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

Next, the above hard coat layer paint was applied to the primer layer of the above primer layer coating film using a bar coater (#6), followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 23

<Production of Modified Polyolefin Resin 23>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 1.0 part by weight of maleic anhydride, 1.2 parts by weight of octyl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 23, in which the weight average molecular weight was 70,000, Tm=65° C., the graft weight of maleic anhydride was 0.8 wt. %, and the graft weight of octyl methacrylate was 1.0 wt. %.

<Production of Hard Coat Film>

A hard coat film (Example 23) was produced in the same manner as in Example 22, except that the primer layer paint in which the resin mixed with the primer layer paint of Example 22 was changed to the modified polyolefin resin 23.

Example 24

<Production of Modified Polyolefin Resin 24>

In a four-necked flask equipped with a stirrer, a condenser, and a dropping funnel, 100 parts by weight of a propylene-ethylene copolymer (propylene component: 88 wt. %, ethylene component: 12 wt. %, weight average molecular weight: 100,000, Tm=65° C.) was dissolved by heating in 400 g of toluene. Then, while maintaining the temperature in the system at 110° C. and stirring, 2.5 parts by weight of maleic anhydride, 1.8 parts by weight of lauryl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 24, in which the weight average molecular weight was 70,000, Tm=65° C., the graft weight of maleic anhydride was 2.2 wt. %, and the graft weight of lauryl methacrylate was 1.6 wt. %.

<Production of Hard Coat Film>

A hard coat film (Example 24) was produced in the same manner as in Example 22, except that the primer layer paint in which the resin mixed with the primer layer paint of Example 22 was changed to the modified polyolefin resin 24.

Example 25

<Production of Modified Polyolefin Resin 25>

In a four-necked flask equipped with a stirrer, a condenser, and a dropping funnel, 100 parts by weight of a propylene-ethylene copolymer (propylene component: 73 wt. %, ethylene component: 27 wt. %, weight average molecular weight: 200,000, Tm=80° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 25, in which the weight average molecular weight was 90,000, Tm=80° C., the graft weight of maleic anhydride was 3.1 wt. %, and the graft weight of octyl methacrylate was 2.0 wt. %.

<Production of Hard Coat Film>

A hard coat film (Example 25) was produced in the same manner as in Example 22, except that the primer layer paint in which the resin mixed with the primer layer paint of Example 22 was changed to the modified polyolefin resin 25.

Example 26

<Production of Modified Polyolefin Resin 26>

In a four-necked flask equipped with a stirrer, a condenser, and a dropping funnel, 100 parts by weight of a propylene-ethylene copolymer (propylene component: 80 wt. %, ethylene component: 20 wt. %, weight average molecular weight: 170,000, Tm=72° C.) was dissolved by heating in 400 g of toluene. Then, while maintaining the temperature in the system at 110° C. and stirring, 4.2 parts by weight of maleic anhydride, 2.6 parts by weight of octyl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 26, in which the weight average molecular weight was 80,000, Tm=72° C., the graft weight of maleic anhydride was 3.2 wt. %, and the graft weight of octyl methacrylate was 2.1 wt. %.

<Production of Hard Coat Film>

A hard coat film (Example 26) was produced in the same manner as in Example 22, except that the primer layer paint in which the resin mixed with the primer layer paint of Example 22 was changed to the modified polyolefin resin 26.

Example 27

<Production of Modified Polyolefin Resin 27>

In a four-necked flask equipped with a stirrer, a condenser, and a dropping funnel, 100 parts by weight of a propylene-ethylene copolymer (propylene component: 89 wt. %, ethylene component: 11 wt. %, weight average molecular weight: 300,000, Tm=60° C.) was dissolved by heating in 400 g of toluene. Then, while maintaining the temperature in the system at 110° C. and stirring, 4.2 parts by weight of maleic anhydride, 2.6 parts by weight of lauryl methacrylate, and 2 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 27, in which the weight average molecular weight was 140,000, Tm=60° C., the graft weight of maleic anhydride was 3.1 wt. %, and the graft weight of lauryl methacrylate was 2.0 wt. %.

<Production of Hard Coat Film>

A hard coat film (Example 27) was produced in the same manner as in Example 22, except that the primer layer paint in which the resin mixed with the primer layer paint of Example 22 was changed to the modified polyolefin resin 27.

Example 28

<Production of Modified Polyolefin Resin 28>

In a four-necked flask equipped with a stirrer, a condenser, and a dropping funnel, 100 parts by weight of a propylene-ethylene-1-butene copolymer (propylene component: 57 wt. %, ethylene component: 31 wt. %, 1-butene component: 12 wt. %, weight average molecular weight: 220,000, Tm=85° C.) was dissolved by heating in 400 g of toluene. Then, while maintaining the temperature in the system at 110° C. and stirring, 8.0 parts by weight of maleic anhydride, 8.0 parts by weight of octyl methacrylate, and 4.5 parts by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin 28, in which the weight average molecular weight was 100,000, Tm=85° C., the graft weight of maleic anhydride was 6.2 wt. %, and the graft weight of octyl methacrylate was 6.5 wt. %.

<Production of Hard Coat Film>

A hard coat film (Example 28) was produced in the same manner as in Example 22, except that the primer layer paint in which the resin mixed with the primer layer paint of Example 22 was changed to the modified polyolefin resin 28.

The following Reference Example is a reference example for the sixth invention described above.

Reference Example

<Production of Modified Polyolefin Resin (Reference Example)>

In a four-necked flask equipped with a stirrer, a condenser, and a dropping funnel, 100 parts by weight of a propylene-1-butene copolymer (propylene component: 67 wt. %, 1-butene component: 33 wt. %, weight average molecular weight: 350,000, Tm=75° C.) was dissolved by heating in 400 g of toluene. Then, while maintaining the temperature in the system at 110° C. and stirring, 1.5 parts by weight of maleic anhydride, 1.8 parts by weight of lauryl methacrylate, and 1 part by weight of di-t-butyl peroxide were each added dropwise over 3 hours, further followed by a reaction for 1 hour. After the reaction, the reaction product was cooled to room temperature and then purified by putting it in a large excess of acetone, thereby obtaining a modified polyolefin resin (Reference Example), in which the weight average molecular weight was 130,000, Tm=75° C., the graft weight of maleic anhydride was 1.3 wt. %, and the graft weight of lauryl methacrylate was 1.6 wt. %.

<Production of Hard Coat Film>

A hard coat film (Reference Example) was produced in the same manner as in Example 22, except that the primer layer paint in which the resin mixed with the primer layer paint of Example 22 was changed to the above modified polyolefin resin (Reference Example).

The hard coat films of the Examples and Reference Example produced as described above were each evaluated for the same items in the same manner as in Example 1 etc., and the results were summarized in Table 4.

TABLE 4

| Table 4 | Primer layer material | | Adhesion | Pencil hardness | Scratch resistance |
|---|---|---|---|---|---|
| | Resin constituent | Component ratio (wt. %) | | | |
| Example 22 | Propylene-ethylene | 88/12 | Acceptable | Acceptable | ○ |
| Example 23 | Propylene-ethylene | 88/12 | Acceptable | Acceptable | ○ |
| Example 24 | Propylene-ethylene | 88/12 | Acceptable | Acceptable | ○ |
| Example 25 | Propylene-ethylene | 73/27 | Acceptable | Acceptable | ○ |
| Example 26 | Propylene-ethylene | 80/20 | Acceptable | Acceptable | ○ |
| Example 27 | Propylene-ethylene | 89/11 | Acceptable | Acceptable | ○ |
| Example 28 | Propylene-ethylene-butene | 57/31/12 | Acceptable | Acceptable | ○ |
| Reference Example | Propylene-butene | 67/33 | Failed | Unmeasurable | ○ |

As is clear from the results of Table 4 above, according to the hard coat films of the Examples, which use the modified polyolefin resin of the present invention (the sixth invention described above) in the primer layer, a hard coat film having excellent adhesion to a hard coat layer can be obtained when using a cycloolefin polymer film as a base material. Moreover, according to the Examples of the present invention, a hard coat film comprising a hard coat layer with excellent hardness (pencil hardness and scratch resistance) can be obtained.

In contrast, the hard coat film of the Reference Example, which uses a resin different from the modified polyolefin resin of the present invention (the sixth invention described above) in the primer layer, has slightly inferior adhesion, and its hard coat layer may have adhesion failure. In the hard coat film of the Reference Example, the above pencil hardness test cannot be properly evaluated when the hard coat layer has inferior adhesion.

The invention claimed is:

1. A hard coat film comprising a hard coat layer containing an ionizing radiation curable resin laminated on at least one surface of a cycloolefin polymer base film through a primer layer, wherein:
    the primer layer contains a modified polyolefin resin in which a polyolefin resin is graft-modified with an α,β-unsaturated carboxylic acid or a derivative thereof, and a (meth)acrylic acid ester,
    the polyolefin resin is a propylene-ethylene copolymer,
    the ratio (wt. %) of a propylene component to an ethylene component (propylene component/ethylene component) in the propylene-ethylene copolymer is in the range of 60/40 to 92/8,
    the graft weight of the α,β-unsaturated carboxylic acid or derivative thereof is in the range of 0.8 to 6.2 wt. % when the amount of the modified polyolefin resin is taken as 100 wt. %, and
    the modified polyolefin resin has a melting point in the range of 60° C. to 85° C.

2. The hard coat film according to claim 1, wherein the modified polyolefin resin has a weight average molecular weight in the range of 40,000 to 150,000.

3. The hard coat film according to claim 1, wherein the α,β-unsaturated carboxylic acid or derivative thereof is one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

4. The hard coat film according to claim 1, wherein the hard coat layer contains, as the ionizing radiation curable resin, a polyfunctional acrylate having three or more (meth)acryloyloxy groups per molecule.

5. A method for producing a hard coat film according to claim 1, the method comprising:
applying a primer layer paint to the cycloolefin polymer base film, followed by drying to form the primer layer;
then applying a hard coat layer paint containing an ionizing radiation curable resin to the primer layer, followed by drying to form the hard coat layer; and
then performing ionizing radiation irradiation.

6. The method for producing a hard coat film according to claim 5, wherein the modified polyolefin resin has a weight average molecular weight in the range of 40,000 to 150,000.

7. The method for producing a hard coat film according to claim 5, wherein the modified polyolefin resin has a glass transition temperature in the range of −30° C. to −10° C.

8. The method for producing a hard coat film according to claim 5, wherein the α,β-unsaturated carboxylic acid or derivative thereof is one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

9. The method for producing a hard coat film according to claim 5, wherein the hard coat layer contains, as the ionizing radiation curable resin, a polyfunctional acrylate having three or more (meth)acryloyloxy groups per molecule.

10. A hard coat film comprising a hard coat layer containing an ionizing radiation curable resin laminated on at least one surface of a cycloolefin polymer base film through a primer layer, wherein:
the primer layer contains a modified polyolefin resin in which a polyolefin resin is graft-modified with an α,β-unsaturated carboxylic acid or a derivative thereof, and a (meth)acrylic acid ester,
the polyolefin resin is a propylene-ethylene copolymer,
the ratio (wt. %) of a propylene component to an ethylene component (propylene component/ethylene component) in the propylene-ethylene copolymer is in the range of 60/40 to 92/8,
the graft weight of the α,β-unsaturated carboxylic acid or derivative thereof is in the range of 0.8 to 6.2 wt. % when the amount of the modified polyolefin resin is taken as 100 wt. %, and
the modified polyolefin resin has a glass transition temperature in the range of −29° C. to −25° C.

11. The hard coat film according to claim 10, wherein the modified polyolefin resin has a weight average molecular weight in the range of 40,000 to 150,000.

12. The hard coat film according to claim 10, wherein the α,β-unsaturated carboxylic acid or derivative thereof is one or more compounds selected from maleic acid, maleic anhydride, fumaric acid, citraconic acid, citraconic anhydride, mesaconic acid, itaconic acid, itaconic anhydride, aconitic acid, aconitic anhydride, himic anhydride, and (meth)acrylic acid.

13. The hard coat film according to claim 10, wherein the hard coat layer contains, as the ionizing radiation curable resin, a polyfunctional acrylate having three or more (meth)acryloyloxy groups per molecule.

14. A method for producing a hard coat film according to claim 10, the method comprising:
applying a primer layer paint to the cycloolefin polymer base film, followed by drying to form a primer layer, wherein the primer layer paint contains a modified polyolefin resin in which a polyolefin resin is graft-modified with an α,β-unsaturated carboxylic acid or a derivative thereof, and a (meth)acrylic acid ester, and the graft weight of the α,β-unsaturated carboxylic acid or derivative thereof is in the range of 0.4 to 7 wt. % when the amount of the modified polyolefin resin is taken as 100 wt. %;
then applying a hard coat layer paint containing an ionizing radiation curable resin to the primer layer, followed by drying to form a hard coat layer; and
then performing ionizing radiation irradiation.

* * * * *